United States Patent [19]

Olafsson et al.

[11] Patent Number: 5,910,959
[45] Date of Patent: Jun. 8, 1999

[54] CONTROL CHANNEL FOR MODEMS

[75] Inventors: Sverrir Olafsson, Seltjarnarnes, Iceland; Sandeep Rajpal, Irvine, Calif.

[73] Assignee: Conexant Systems, Inc., Newport Beach, Calif.

[21] Appl. No.: 08/779,084

[22] Filed: Jan. 6, 1997

[51] Int. Cl.[6] .................................................. H03M 13/00
[52] U.S. Cl. ...................... 371/37.1; 371/40.1; 370/522; 395/200.57
[58] Field of Search .................................. 371/37.1, 40.1; 370/445, 522, 264, 463; 357/222; 358/434; 379/93; 395/182.04, 200.57, 200.6; 364/514 B

[56] References Cited

U.S. PATENT DOCUMENTS

| 4,009,356 | 2/1977 | Borysiewicz et al. | 179/170.2 |
| 4,044,307 | 8/1977 | Borysiewicz et al. | 325/42 |
| 4,617,656 | 10/1986 | Kobayashi et al. | 370/445 |
| 5,041,917 | 8/1991 | Koshiishi | 358/434 |
| 5,295,156 | 3/1994 | Heep et al. | 375/222 |
| 5,438,614 | 8/1995 | Rozman et al. | 379/93 |
| 5,487,077 | 1/1996 | Hassner et al. | 371/40.1 |
| 5,502,653 | 3/1996 | Lewis | 364/514 B |
| 5,644,695 | 7/1997 | Blaum et al. | 395/182.04 |

OTHER PUBLICATIONS

Rajiv Laroia, "Coding for Intersymbol Interference Channels—Combined Coding and Precoding", IEEE, VO. 42, Issue 4, Jul. 1996.

Krzysztof Wesolowski, "Receiver Structures For Trellis–coded Multipoint QAM Signal", IEEE, 1988.

Lettieri et al., "Data Compression in the V.42bis modems", IEEE, 1994.

Primary Examiner—William Grant
Assistant Examiner—McDievnel Marc
Attorney, Agent, or Firm—Philip K. Yu; Mark M. Takahashi

[57] ABSTRACT

A methodology for a modem control channel is disclosed. The channel allows faster seamless rate change and precoder tap exchange than the baseline procedure for seamless rate change, allowing for more robust transmission of control information. It can also be use to convey side-information in the case of multiple data applications, serving the purpose of mode switching. Thus, with a single control channel both the needs for seamless rate change and transmitting control information for multiple data applications can be met.

17 Claims, 4 Drawing Sheets

CONTROL CHANNEL FOR MODEMS

BACKGROUND OF THE INVENTION

The present invention relates to modems. One contemporary example of a modem is one operating in accordance with International Telecommunication Union, Telecommunications Standardization Sector (ITU-T) Recommendation V.34, commonly referred to as "V.34 modem." The ITU-T Recommendation V.34 of September 1994, entitled Data Communication over the Digital Network, is hereby incorporated by reference.

It has become quite common for high-speed modems, such as V.34 modems, to perform a rate change during a communication session, when one modem experiences transmission difficulties such that the transmission rate between the other modem and itself needs to be re-negotiated accordingly. For V.34 modems, the rate change cannot be performed in a "seamless" way such that the session will need to be shut down and restarted after the rate change. This has been a drawback for the conventional V.34 modems.

In an ITU-T Study Group 14 meeting in Orlando, Fla., Dec. 13–14, 1993, there was a contribution, where an auxiliary channel operating procedure for seamless rate change an modem control was proposed for V.34. Later in another Study Group 14 meeting in Clearwater, Fla., Jan. 8–10, 1996, that same procedure was proposed as an extension for (then accepted) V.34, and accepted at the meeting as a baseline draft for V.34 seamless ate change procedure. Finally, in a TR-30 Technical Committee meeting of the TIA in Honolulu, Feb. 5–9, 1996, a technical contribution was made by Rockwell International, the Assignee of the present invention, for a faster seamless rate change, and her for a modem control channel for V.34. The Contributions made during the Orlando, Clearwater and Honolulu meetings are hereby incorporated by reference.

In the Clearwater contribution, the proposed scheme of using the modem control superframes to do seamless rate change was still too slow and problematic for some applications. If a seamless rate change requested from a local modem to a remote modem took a whole superframe to be effected, some modem receivers (e.g. on cellular connections) would already have collapsed and a full retrain would be necessary. Therefore, there has been a tremendous demand for faster seamless rate change such that the procedure ill keep up with the ever-evolving communications systems, such as wireless applications.

Also, as applications become more multimedia-oriented, there has been great demand for the channel to accommodate more than just one form of data in an efficient way.

BRIEF SUMMARY OF THE INVENTION

A novel and efficient methodology for multiplexing control information along with user data on a generic data transmission system is disclosed. While the invention is disclosed with reference to the V.34 Recommendation, it can be readily adapted for use with other data transmission techniques, wireline or wireless. The new methodology allows splitting of the main data channel into two or more channels. These additional channels can be used to send control information for the various types of data being multiplexed over the main channel. In addition, as will be described in the Detailed Description of the Preferred Embodiment, the new methodology also allows for rapid seamless rate change, which is particularly suitable for V.34 environment.

The aforementioned technique discloses a method of transmitting control information between first modem ("modem A") and second modem ("modem B") operating in accordance with V.34 Recommendation. The method comprises the steps of: a) providing modem A and modem B in communication in accordance with the V.34 Recommendation in rate R1; b) modem A asserting its mode indicator ("MI") bit; c) modem A transmitting control information and the asserted MI bit to modem B; d) modem B receiving the control information and asserted MI bit from modem A; e) modem B processing said control information and the asserted MI bit from modem A based on a predetermined criteria; f) if the control information from modem A requires a positive response to which modem B agrees, modem B asserting its MI bit and transmitting the control information back to modem A as acknowledgment and g) modem A proceeding to communicate with modem B.

BRIEF DESCRIPTION OF THE DRAWINGS

Additional objects, features and advantages of the present invention will be disclosed in the following description, wherein.

DETAILED DESCRIPTION OF THE PREFERRED EMBODIMENT

1. Introduction

A novel and efficient methodology for multiplexing control information along with user data on a generic data transmission system is disclosed. While the invention is disclosed with reference to the V.34 Recommendation, it can be readily adapted for use with other data transmission techniques, wireline or wireless. The new methodology allows splitting of the main data channel into two or more channels. These additional channels can be used to send control information for the various types of data being multiplexed over the main channel. In addition, as will be described in the Detailed Description of the Preferred Embodiment, the new methodology also allows for rapid seamless rate change, which is particularly suitable for the V.34 environment.

Also, it should be noted that the mathematical notation used hereinafter is the same as in V.34. For seamless rate change, the control channel would allow the complete rate information to be transmitted in one data frame instead of a full superframe as in the baseline V.34 procedure. Precoder taps can also be exchanged very quickly. For multiple data applications, e.g. audio over data, the audio side-information, as well as seamless rate-change information, may be transmitted in the control channel. Rate switching for multiple data frames would thus follow the enabling of the control channel.

Further applications for the control channel may be readily adapted by those skilled in the art. A variety of network control information can be transmitted in the control channel. The control information can also be used for higher-layer protocol negotiations or for multiplexing purposes. Another use can be achieved by increasing the number of bits allocated for the control channel itself to higher multiples of 2400 bps.

For ease of explanation, let us say we allocate 2400 bps for the control channel. Each data frame will have a mode indicator ("MI"), transmitted in its last mapping frame. Each I1-bit (I1-bit of V.34) of that mapping frame would provide the indicator state. For MI=0, the following data frame would contain only user data at rate R1. In other words, the modem system continues with communication at the data rate R1 when the MI indicates user data. Consequently, for the next data frame, the receive modem will receive user information at the data rate R1. If MI=1, user data would be transmitted at data rate R2-2400, and control data at rate 2400 bps. For multiple data applications, R2 would be the negotiated multiple data rate. In V.34, R2 could be selected lower than R1 to allow higher robustness for the control data.

The V.34 mapping parameters should preferably be modified to allow for the mode indicator. Also, the occurrence of errors in reception of MI should preferably be at least an order of magnitude lower than regular data errors for a simple detection algorithm. However, with a more complex algorithm, two orders of magnitude could be achieved. This is necessary, since the result of an error in detection of MI would normally be similar to a regular data error, except that it may cause a larger number of bits in error.

One advantage of the methodology in accordance with the present invention is that early detection of MI is possible. This allows a different data rate immediately at the data frame boundary as needed for certain multiple data applications (for example audio over data). It also allows advance notice of the change in user data rate, which may be important if flow control on the output data is necessary. This may reduce buffering-delay in certain cases.

2. Details of the Control Channel

Figure 1:
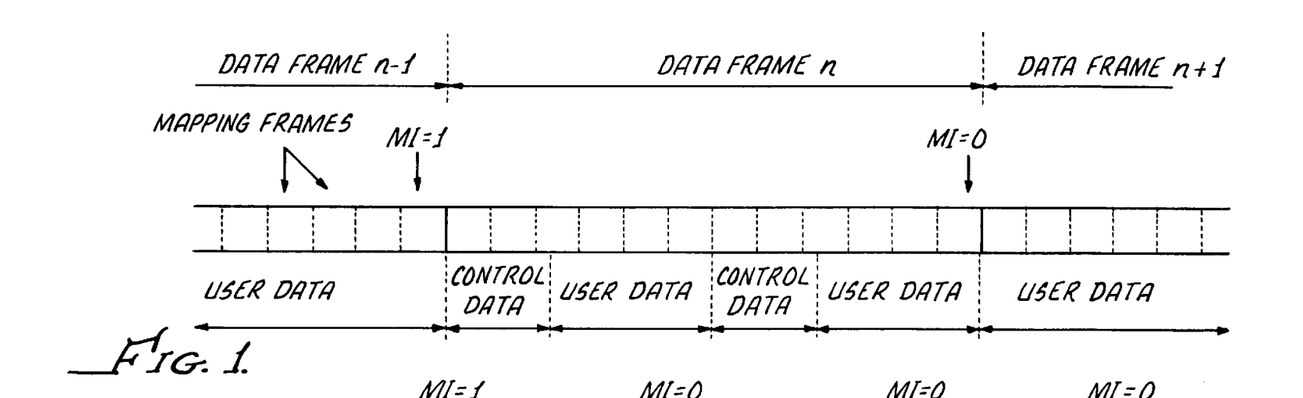
FIG. 1 illustrates the transmission of the Mode Indicator in accordance with the present invention.

The control channel will be invoked by transmitting the mode indicator (MI) in the last mapping frame of a data frame. In the subsequent data frame, the total data rate will change from R1 to R2. As shown in FIG. 1, the subsequent data frame associated with rate R2 preferably includes control data and user data. The control channel information would be transmitted in two halves, the first half at the beginning of the data frame and the second half at the start of mapping frame P/2 if P is even, and at (P-1)/2 if P is odd, where P is the number of mapping frames in a data frame. This is shown in FIG. 1 for P=12 (symbol rate—2400 symbols/s). In case of 40 ms data frames, 48 bits would be transmitted in each half, 42 bits in case of 35 ms data frames. Generally, for critical control information, both halves would contain the same information. If either half is received in error, the other is still likely to be decoded correctly. As opposed to spreading the information throughout the data frame, this minimizes the propagation delay.

Figure 2:
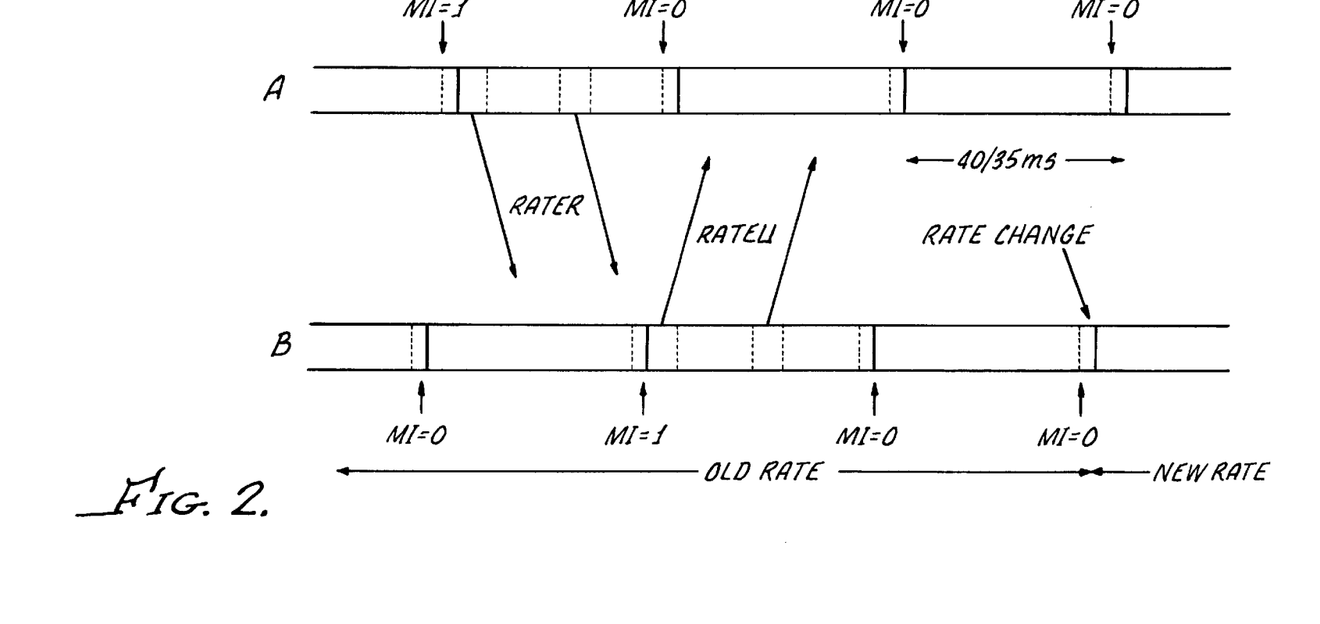
FIG. 2 illustrates an example of how a seamless rate change is performed in the V.34 environment.

FIG. 2 gives an example of how a seamless rate change is accomplished in the V.34 environment, using the proposed technique. First, modem A transmits a rate request RATER, to which modem B replies with a rate update RATEU. The rate change then occurs at the second data frame boundary after the RATEU frame. Note that on demod-remod connections, RATEU is transmitted in the second-last data frame before a superframe boundary.

Using this method, the time taken for a rate change is less than 4 data frames, or 160 ms. Depending on the relative position of transmitted and received data frames in modem B, the rate change can be accomplished in as little as 130 ms. According to the baseline draft for seamless rate change accepted in the Clearwater meeting, January 1996, a rate change will take between 750 and 1000 ms. The difference between the two methods can become quite significant in certain applications, such as on cellular channels.

It should be noted that at higher data rates, an extra data frame between the RATEU frame and the rate change is not necessary. It may prove beneficial to add the extra data frame only when the older transmission rate is lower than, say, 14,400 bps. This could also be indicated in the RATER frame. Then the rate changes can be completed in 50–120 ms.

3. Mode Indicator Coding

The following description presumes that the control channel in accordance with the present invention is implemented on the V.34 platform. Generalization to any other data transmission techniques can be carried out in a similar way. Consider the simple case, where we have a two data application, for example, audio over data. In this case, the control information sent would also contain information related to audio. The following scenario is very specific for the aforementioned audio over data application. We shall use the I1 bit in the V.34 signal mapper to transmit the mode indicator. In the preferred V.34 embodiment, in which each mapping frame comprises a plurality of symbols, the MI includes one bit from each of the plurality of symbols. In the last mapping frame of a data frame, the mode indicator is transmitted using the I1 bit in all 4-D symbols, i.e., it is transmitted 4 times. This results in the second 2-D symbol of each 4-D symbol being rotated by 180° in the clockwise direction, if MI=1.

Figure 3:
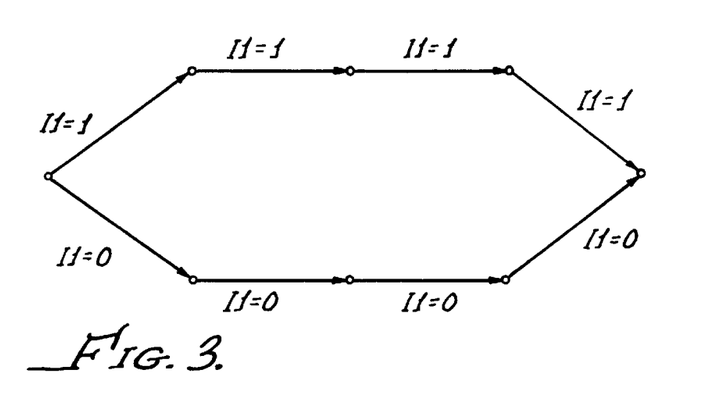
FIG. 3 shows the trellis diagram for the (4,1,4) repetition code for decoding.

Detection of the Mode Indicator bit is fairly straightforward. It should be noted that there are two possible transmitted sequences for the Mode Indicator bit. One of the sequences is (1, 1, 1, 1) and the second one is (0, 0, 0, 0). These two sequences together form the code sequences of a (4, 1, 4) trivial binary repetition code of length 4 and minimum Hamming distance 4. The trellis diagram of this code can be used to do the decoding. FIG. 3 shows the trellis diagram for the (4, 1, 4) repetition code.

Let the four received 4-D symbols be denoted by $(r_1, r_2, r_3, r_4)$. The decoding of the Mode Indicator bit using the trellis diagram of the (4, 1, 4) code proceeds as follows:

1) Calculate $m_{1,I1=0}$, where $m_{1,I1=0}$ denotes the squared Euclidean distance of $r_1$ from the closest 4-D point having I1=0.
2) Calculate $m_{1,I1=1}$, where $m_{1,I1=1}$ denotes the squared Euclidean distance of $r_1$ from the closest 4-D point having I1=1.
3) Calculate $m_{2,I1=0}$, where $m_{2,I1=0}$ denotes the squared Euclidean distance of $r_2$ from the closest 4-D point having I1=0.
4) Calculate $m_{2,I1=1}$, where $m_{2,I1=0}$ denotes the squared Euclidean distance of $r_2$ from the closest 4-D point having I1=1.
5) Calculate $m_{3,I1=0}$, where $m_{3,I1=0}$ denotes the squared Euclidean distance of $r_3$ from the closest 4-D point having I1=0.

6) Calculate $m_{3,I1=1}$, where $m_{3,I1=1}$ denotes the squared Euclidean distance of $r_3$ from the closest 4-D point having I1=1.
7) Calculate $m_{4,I1=0}$, where $m_{4,I1=0}$ denotes the squared Euclidean distance of $r_4$ from the closest 4-D point having I1=0.
8) Calculate $m_{4,I1=1}$, where $m_{4,I1=1}$ denotes the squared Euclidean distance of $r_4$ from the closest 4-D point having I1=1.
9) Calculate $D_{MI=0} = m_{1,I1=0} + m_{2,I1=0} + m_{3,I1=0} + m_{4,I1=0}$
10) Calculate $D_{MI=1} = m_{1,I1=1} + m_{2,I1=1} + m_{3,I1=1} + m_{4,I1=1}$ Note that $D_{MI=0}$ denotes the squared Euclidean distance of the path with MI=0 and $D_{MI=1}$ denotes the squared Euclidean distance of the path with MI=1. The path with the lower squared Euclidean distance gives the decoded MI.

Note that the above is merely the Viterbi decoding algorithm applied on the trellis of the binary (4, 1, 4) code. It should be apparent that one can generalize the above to more complex situations. Now consider the case where we have a three data application, say, for example, video+audio+data. In this case, instead of using the (4, 1, 4) code, we could use a binary (4, 2, 2) code, where the length of the code is 4, number of information symbols is 2 and minimum Hamming distance is 2. The rows of the generator matrix of the binary (4, 2, 2) code are (1, 1, 1, 1) and (0, 1, 0, 1). The information bits (1, 1) could indicate that the control code information being sent contains both video and audio information. The bits (1, 0) could indicate that only video is being sent and (0, 1) could indicate that only audio is being sent.

These two message bits could be encoded using the (4, 2, 2) code into a coded 4-bit sequence and transmitted as is previously described in the audio over data application. The performance may be slightly deteriorated in the video+audio+data application, since the minimum Hamming distance has decreased to 2. However, that degradation can be compensated for by using regular trellis decoding as will be described below. It should apparent to those skilled in the art that there are a variety of options that can be used for the Mode Indicator bit. One can even go to longer length codes, say, for example length 8 binary Reed-Muller codes, which would compensate for the loss of performance, while allowing numerous data applications, albeit with a little complexity increase. The soft-decision decoding complexity of length 8 binary Reed-Muller codes is fairly simple, so they could present a very viable solution for practical applications.

The above decoding technique for the Mode Indicator bit is a simple technique for detecting the Mode Indicator bit. Detection can be further enhanced by performing trellis decoding using the trellis for the V.34 trellis codes in a usual manner and using the resulting decoded symbols to find out the Mode Indicator bit. This would result in enhanced performance, albeit with delay increase and also a little complexity increase.

Those skilled in the art will appreciate that during the process of calculating the distances that are needed by the trellis decoding process, one calculates the distances needed by the Mode Indicator bit as an interim process and one is not really calculating any distances specially for the Mode Indicator bit. Thus, much of the decoding process for the Mode Indicator bit is already a part of the trellis decoding process for V.34. As such, there is no additional impact on the overall decoding complexity by the addition of the Mode Indicator bit.

Without using the trellis metrics, the decoding using the (4, 1, 4) code corresponds to decoding a 16-dimensional block code, with minimum squared distance 16 and 256 nearest neighbors. With only Gaussian noise, the error probability can be approximated by $256*Q(2/\sigma)$, where C is the standard deviation of the noise. At worst case conditions, i.e. 28.8 kbps and $10^{-2}$ block error rate, the standard deviation of the noise is around 0.45. Then, using this approximation, errors in detecting the mode indicator can be expected to be about 10 times less often than regular data errors, or at 30 second intervals vs. 3–4 seconds. Simulations indicated this interval to be even higher, or around 100 seconds. By using the trellis decoding technique as mentioned above, this can be increased somewhat to lower the error event rate to less than 1/100 of the main channel error event rate.

For other trellis-coding systems than V.34, the method can be extended as follows. Given "A" points in the constellation to be used by the trellis-coded system, divide the set of points into "b" partitions, where the partitions are created using a certain design rule, which is fixed a priori. For example, in the V.34 example discussed above, we create two partitions, using I1=0 and I1=1. As a result, each partition would have A/b points associated with it.

Next, "c" symbols would be allocated, where a certain pattern in the "c" symbols would indicate a certain mode for the Mode Indicator. Note, each "symbol" would have the same dimensionality as the constellation. Next, we construct a linear block code of length "c" over GF(b), where GF denotes Galois field and "b" is either a prime or a power of a prime and "b" should normally be chosen to be 2, for practical reasons, since linear binary codes are normally easier to decode than non-binary codes. Select "d" possible codewords from the possible $b^c$ codewords, such that the distance between the codewords is maximized. Then "d" different "commands" or $\log_2 d$ bits can be transmitted with the Mode Indicator. For more information on Galois Field, attention is directed to ERROR CONTROL CODING: FUNDAMENTALS AND APPLICATIONS, Lin, Shu & Daniel J. Costello, Jr., Prentice-Hall, 1983. Note, that the above would equally well apply if a non-linear block code was selected instead of a linear code, though in most cases, decoding of the non-linear code would be harder, and as such we will focus on linear codes.

4. Precoding Considerations

Figure 4:
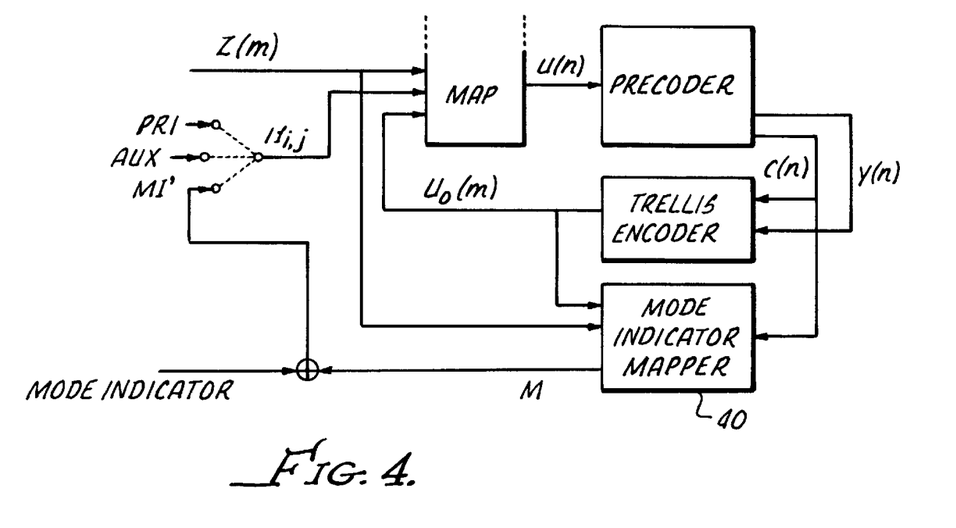
FIG. 4 illustrates a simplified block diagram of the encoding of the Mode Indicator.

The mode information decoding is done on the output of the noise predictor in the receiver. This eliminates the dither sequence from decoder considerations, but it does require that certain modifications be made to the transmitted I1 bit. The circuit is similar to that for the trellis bit $U_0$ ( in V.34 ), and is shown in FIG. 4.

The Mode Indicator Mapper 40 counteracts the modification to the trellis subset after adding c(n). The equation for mode indicator mapper output M is given by:

$$M = (c_0 + c_1)(U_0 + Z_0) + (c_2 + c_3)Z_0 + c_1 + c_2 + (c_0 + c_1)(c_2 + c_3)$$

where $Z_0$ is the 1sb of Z, the differential encoder output, and $c_i$ is 0 if the i-th coordinate of the 4-dimensional signal (c(2m)/2,c(2m+1)/2) is even, and I if the corresponding coordinate is odd.

5. Bit Allocation for the Control Channel

One of the advantages of the Control Channel in accordance with the present invention is faster seamless rate change and the ability to multiplex control information for multiple data application in a regular data frame. The following is an example as to how the Control Channel bits can be allocated for both cases, in the specific case of audio over data for V.34. The general procedure of the baseline V.34 draft for seamless rate change is followed where applicable.

Each half of the Control Channel should be kept separate, as described in Section 2. For the more critical frames it may be appropriate for them to contain the same information. Table 1 shows the general framing for each half.

TABLE 1

Modem Control Frame Structure

| Bit Position | # bits | Usage |
|---|---|---|
| 0:5 | 6 | Set to 111110 |
| 6:9 | 4 | Modem control type |
| 10:41 | 32 | Modem control data |

At 40 ms frame sizes, the 2400 bps increment offers a total of 96 bits, whereas there are 84 bits in 35 ms frames. Although the 12 extra bits in 40 ms frames may be put to some use, it is preferred that they be left unused to keep the mapping identical for both frame sizes.

The modem control types may be defined similar to the baseline V.34 draft for seamless rate change, as shown in Table 2. However, the precoder control categories, PRECODER, PRECODEU and PRECODECRC are combined here as PRECODECTL, with the distinction made in the control data field.

TABLE 2

Modem Control Type Categories.

| Modem Control Category | Description | Control Type Bit Mapping |
|---|---|---|
| RATER | Rate update request | 0000 |
| RATEU | Rate update | 0011 |
| PRECODECTL | Precoder control frame | 0101 |
| PRECODECOEF | Precoder coefficient | 1010 |

In normal V.34 operation, the RATER and RATEU frames will contain the same information in the data field as the baseline draft, as shown in Tables 3 and 4. The difference is that instead of transmitting the same information four times, it is sent once in each 42-bit half of the Control Channel data frame with an 8-bit CRC attached to each.

TABLE 3

Data Field Bit Mapping for RATER

| Bit Position | # bits | Usage |
|---|---|---|
| 0:3 | 4 | Maximum call to answer modem data rate |
| 4:7 | 4 | Maximum answer to call modem data rate |
| 8:23 | 16 | set to 1 |
| 24:31 | 8 | 8-bit CRC |

TABLE 4

Data Field Bit Mapping for RATEU.

| Bit Position | # bits | Usage |
|---|---|---|
| 0:3 | 4 | Updated call to answer modem data rate |
| 4:7 | 4 | Updated answer to call modem data rate |
| 8:23 | 16 | set to 1 |
| 24:31 | 8 | 8-bit CRC |

After sending a RATEU, the rate will then change at the next data frame boundary, as described in Section 2. Thus, essentially the same type of procedure will be used as described in the baseline V.34 draft, where superframe boundaries have become data frame boundaries.

Seamless rate change can be defined in a similar way as above for V.34 audio over data. The control fields would be defined the same as for regular V.34 operation, as in Table 2. Tables 5 and 6 give an example of how the data fields may be defined for RATER and RATEU.

TABLE 5

Data Field Bit Mapping for RATER in V.34 audio over data.

| Bit Position | # bits | Usage |
|---|---|---|
| 0:3 | 4 | Maximum call to answer modem data-only rate |
| 4:7 | 4 | Maximum answer to call modem data-only rate |
| 8:11 | 4 | Maximum call to answer modem audio+data rate |
| 12:15 | 4 | Maximum answer to call modem audio+data rate |
| 16:17 | 2 | $Sigma_n$: Local received audio impairment level |
| 18:23 | 6 | set to 1 |
| 24:31 | 8 | 8-bit CRC |

TABLE 6

Data Field Bit Mapping for RATEU in V.34 audio over data.

| Bit Position | # bits | Usage |
|---|---|---|
| 0:3 | 4 | Updated call to answer modem data-only rate |
| 4:7 | 4 | Updated answer to call modem data-only rate |
| 8:11 | 4 | Updated call to answer modem audio+data rate |
| 12:15 | 4 | Updated answer to call modem audio+data rate |
| 16:17 | 2 | $Sigma_n$: Local received audio impairment level |
| 18:23 | 6 | set to 1 |
| 24:31 | 8 | 8-bit CRC |

The precoder tap control frames would become as shown in Table 7. The same control and data fields should be transmitted in both halves of the data frame for the PRECODER and PRECODEU frames.

TABLE 7

Data Field Bit Mapping for PRECODECTL.

| Bit Position | # bits | Usage |
|---|---|---|
| 0:1 | 2 | 00: Precode coefficient update request, PRECODER<br>01: Precode coefficient update, PRECODEU<br>10: Precode CRC, PRECODECRC |
| 2:17 | 16 | If bits 0:1 are set to 10, a 16-bit CRC of the real and imaginary parts of the precoder coefficients is transmitted here, otherwise all bits are set to 1. |
| 18:23 | 6 | set to 1. |
| 24:31 | 8 | 8-bit CRC |

The precoder taps themselves are transmitted in PRECODECOEF frames as shown in Table 8. To transfer precoder coefficients, the modem transmits a PRECODER frame in both halves of a data frame, then the first two precoder taps in the second data frame, followed by the third precoder tap and a PRECODECRC frame in the third data frame. If the remote modem receives all 3 data frames properly, it may reply with a PRECODEU frame transmitted in both halves of a data frame. The new precoder taps are then inserted at the beginning of the second data frame after the PRECODEU data frame.

TABLE 8

Data Field Bit Mapping for PRECODECOEF.

| Bit Position | # bits | Usage |
|---|---|---|
| 0:15 | 16 | Real part of precoder coefficient |
| 16:31 | 16 | Imaginary part of precoder coefficient |

6. Simulation Results

The robustness of the mode indicator was simulated using a 16-state trellis code for V.34 audio over data. The results were compared to the error rate for the user data. At the higher data rates, around 24.0 kbps to 28.8 kbps, there was approximately one 1000-bit block in each data frame.

The mode indicator was decoded using two methods, with and without trellis metric information, as described in Section 3. In both cases, it was decoded without any decoding delay, and infinite grid decoding. Without the trellis information, the distance of the trellis point closest to the received point corresponding to both I1=0 and I1=1 were computed for each 4-D symbol. After receiving all four symbols, the distances for both possibilities were added and the value corresponding to the lower one selected as the decoder output.

When the trellis decoder information was used, the trellis state metrics before the reception of the mode indicator were stored. The possible paths through the trellis were then extended in the next four 4-D symbols, given the constraints of the initial state and the fact that all I1-bits were known to be constant. Although this algorithm was rather computation intensive, simplified algorithms exist that achieve almost as good performance with much less computation.

Figure 5:
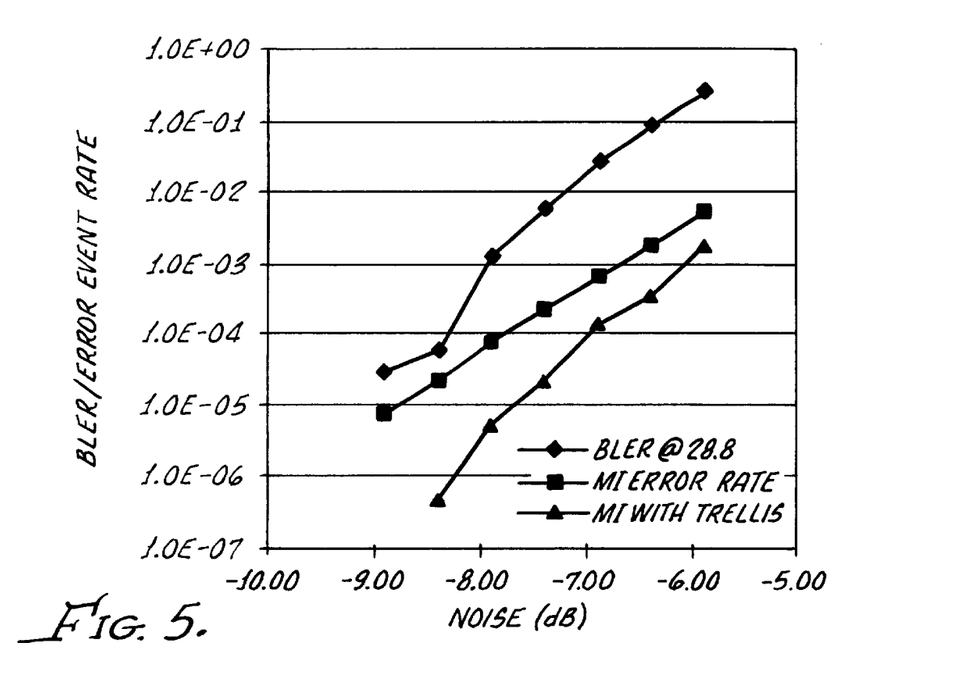
FIG. 5 shows the results for regular data operation in simulation.

FIG. 5 shows the results for regular data operation. The horizontal axis showed the noise power relative to a signal scaling where the distance between signal points was 2.

Clearly, from FIG. 5, the robustness of the mode indicator was close to an order of magnitude better than that of the user data for the simpler decoding method. Only at the lowest error rates was the difference lower. However, using the trellis information provided more than 2 orders of magnitude better performance over the range of error rates simulated.

Figure 6:
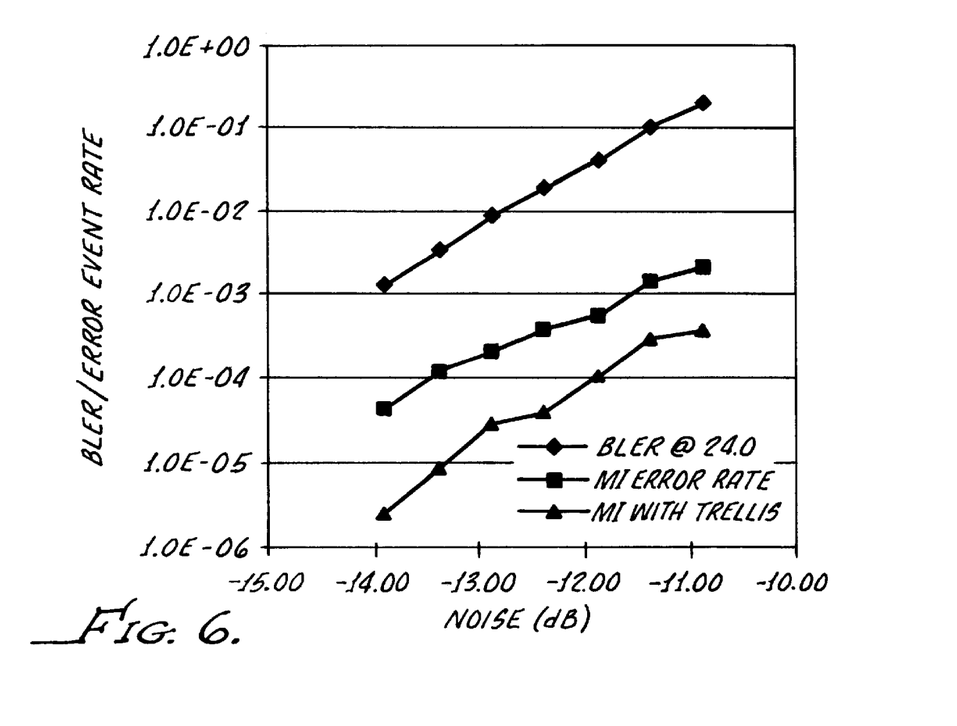
FIG. 6 shows performance of V.34 modems in audio+data mode.

FIG. 6 shows the performance of V.34 in audio+data mode, where the user data rate was 24.0 kbps. The audio was assumed to be uniformly distributed throughout the possible audio modulation region. The results were even better here than in the data-only case.

Figure 7:
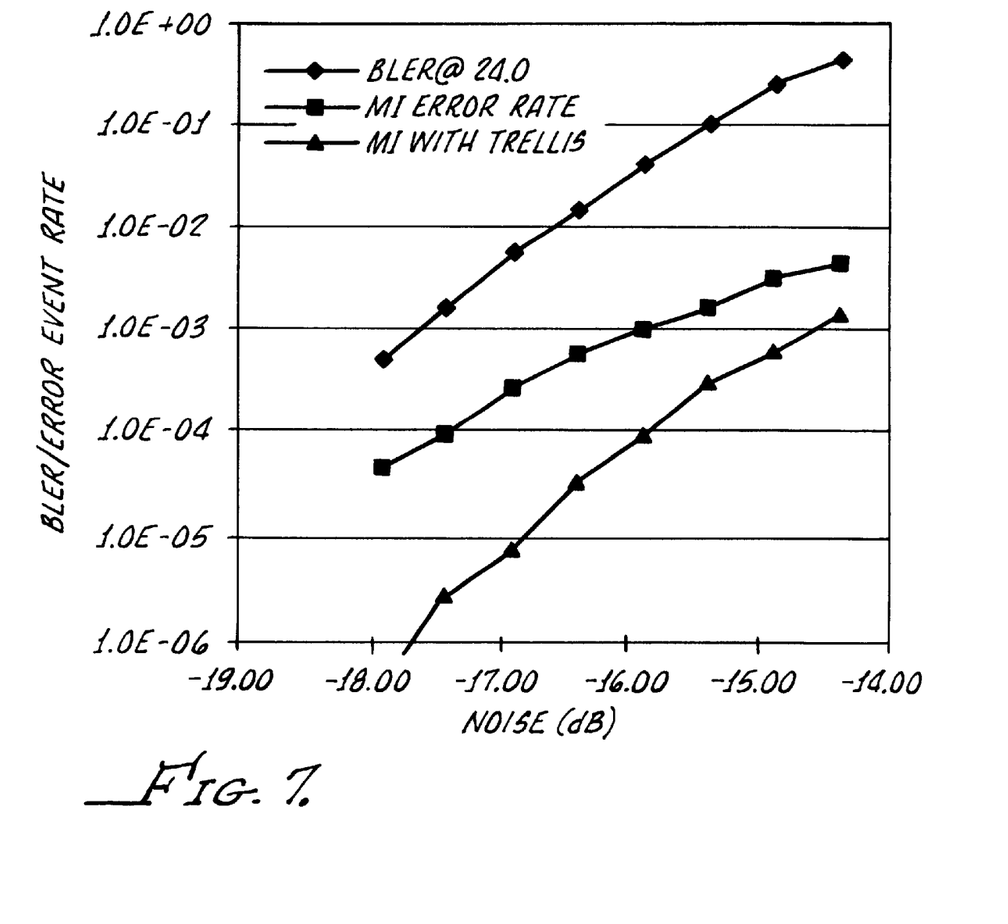
FIG. 7 shows performance of V.34 modems in the extreme case where the audio was completely saturated along the perimeter of the audio modulation region.

In FIG. 7, the extreme case of where the audio was completely saturated along the perimeter of the audio modulation region is shown. This case was very specific to the audio over data application on the V.34 platform. Again, the simple algorithm achieved more than an order of magnitude lower error rate, and more than two orders of magnitude when the trellis information was used.

7. Modifications to V.34 Mapping Parameters

If the four I1 bits in the last mapping frame of a data frame are used for the mode indicator, the current mapping parameters for V.34 will not allow enough bits to be transmitted. This could be remedied by using 4 auxiliary channel bits, reducing the auxiliary channel rate considerably. Preferably, the V.34 mapping parameters could be recalculated taking into account the transmission of four more bits in each data frame. In this section, the changes that need to be made to the mapping parameters are detailed.

First of all, the total number of bits per data frame would become N+4 (V.34 sec. 8.2), and then b would be the smallest integer not less than (N+4)/P, and equation 8-2/V.34 would become:

$$r = N+4-(b-1)P$$

where $1 \leq r \leq P$

The switching patterns SWP would thus become as shown in Table 9, where modified values of b and SWVP which allow for the mode indicator are shown.

TABLE 9

| Data Rate, R | 2400 P = 12 | | 2743 P = 12 | | 2800 P = 14 | | 3000 P = 15 | | 3200 P = 16 | | 3429 P = 16 | |
|---|---|---|---|---|---|---|---|---|---|---|---|---|
| | b | SWP | b | SWP | b | SWP | b | SWP | b | SWP | b | SWP |
| 2400 | 9 | 249 | | | | | | | | | | |
| 2600 | 9 | FFF | | | | | | | | | | |
| 4800 | 17 | 249 | 15 | 249 | 14 | 3FFF | 14 | 0001 | 13 | 1111 | 12 | 1555 |
| 5000 | 17 | FFF | 15 | 7FF | 15 | 15AB | 14 | 2D6B | 13 | 7777 | 12 | 3FFF |
| 7200 | 25 | 249 | 22 | 249 | 21 | 1FBF | 20 | 1555 | 19 | 1111 | 18 | 0001 |
| 7400 | 25 | FFF | 22 | 7FF | 22 | 0A95 | 20 | 7FFF | 19 | 7777 | 18 | 2AAB |
| 9600 | 33 | 249 | 29 | 249 | 28 | 1BB7 | 26 | 3F7F | 25 | 1111 | 23 | 36DB |
| 9800 | 33 | FFF | 29 | 7FF | 29 | 0489 | 27 | 14A5 | 25 | 7777 | 24 | 0081 |
| 12000 | 41 | 249 | 36 | 249 | 35 | 15AB | 33 | 0889 | 31 | 1111 | 29 | 0889 |
| 12200 | 41 | FFF | 36 | 7FF | 36 | 0081 | 33 | 3DEF | 31 | 7777 | 29 | 3777 |
| 14400 | 49 | 249 | 43 | 249 | 42 | 0A95 | 39 | 36DB | 37 | 1111 | 34 | 3F7F |
| 14600 | 49 | FFF | 43 | 7FF | 42 | 3FFF | 40 | 0421 | 37 | 7777 | 35 | 1249 |
| 16800 | 57 | 249 | 50 | 249 | 49 | 0489 | 46 | 0001 | 43 | 1111 | 40 | 1555 |
| 17000 | 57 | FFF | 50 | 7FF | 49 | 1FBF | 46 | 2D6B | 43 | 7777 | 40 | 3FFF |
| 19200 | 65 | 249 | 57 | 249 | 56 | 0081 | 52 | 1555 | 49 | 1111 | 46 | 0001 |
| 19400 | 65 | FFF | 57 | 7FF | 56 | 1BB7 | 52 | 7FFF | 49 | 7777 | 46 | 2AAB |
| 21600 | 73 | 249 | 64 | 249 | 62 | 3FFF | 58 | 3F7F | 55 | 1111 | 51 | 36DB |
| 21800 | 73 | FFF | 64 | 7FF | 63 | 15AB | 59 | 14A5 | 55 | 7777 | 52 | 0081 |
| 24000 | 81 | 249 | 71 | 249 | 69 | 1FBF | 65 | 0889 | 61 | 1111 | 57 | 0889 |
| 24200 | | | 71 | 7FF | 70 | 0A95 | 65 | 3DEF | 61 | 7777 | 57 | 3777 |
| 26400 | | | 78 | 249 | 76 | 1BB7 | 71 | 36DB | 67 | 1111 | 62 | 3F7F |
| 26600 | | | 78 | 7FF | 77 | 0489 | 72 | 0421 | 67 | 7777 | 63 | 1249 |

TABLE 9-continued

| Data Rate, R | 2400 P = 12 b SWP | 2743 P = 12 b SWP | 2800 P = 14 b SWP | 3000 P = 15 b SWP | 3200 P = 16 b SWP | 3429 P = 16 b SWP |
|---|---|---|---|---|---|---|
| 28800 | | | | 78 0001 | 73 1111 | 68 1555 |
| 29000 | | | | 78 2D6B | 73 7777 | 68 3FFF |
| 31200 | | | | | 79 1111 | 74 0001 |
| 31400 | | | | | 79 7777 | 74 2AAB |
| 33600 | | | | | | 79 36DB |
| 33800 | | | | | | 80 0081 |

The AMP patterns would also have to change to avoid having to send an auxiliary channel bit in the last mapping frame of the data frame. The algorithm to generate AMP would become as follows:

Prior to each data frame, a counter is set to W. The counter is incremented by W at the beginning of each mapping frame. If the counter is less than P, a primary channel bit is sent; otherwise, an auxiliary channel bit is sent, and the counter is decremented by P.

The multiplexing patterns then become as shown in Table 10, where modified values of AMP which allow for the mode indicator are shown.

TABLE 10

| Symbol Rate (S) | W | P | AMP |
|---|---|---|---|
| 2400 | 8 | 12 | DB6 |
| 2743 | 7 | 12 | AD6 |
| 2800 | 8 | 14 | 2B56 |
| 3000 | 8 | 15 | 5556 |
| 3200 | 8 | 16 | AAAA |
| 3429 | 7 | 15 | 2AAA |

Some of the mapping parameters K, M and L will also change and become as shown in Table 11 (modified numbers are shown in boldface). Yet, no new combinations of K, M and L were introduced.

TABLE 11

| Symbol Rate, R | Data Rate, R | K | M minimum | M expanded | L minimum | L expanded |
|---|---|---|---|---|---|---|
| 2400 | 2400 | 0 | 1 | 1 | 4 | 4 |
| | 2600 | 0 | 1 | 1 | 4 | 4 |
| | 4800 | 5 | 2 | 2 | 8 | 8 |
| | 5000 | 5 | 2 | 2 | 8 | 8 |
| | 7200 | 13 | 4 | 4 | 16 | 16 |
| | 7400 | 13 | 4 | 4 | 16 | 16 |
| | 9600 | 21 | 7 | 8 | 28 | 32 |
| | 9800 | 21 | 7 | 8 | 28 | 32 |
| | 12000 | 29 | 13 | 15 | 52 | 60 |
| | 12200 | 29 | 13 | 15 | 52 | 60 |
| | 14400 | 29 | 13 | 15 | 104 | 120 |
| | 14600 | 29 | 13 | 15 | 104 | 120 |
| | 16800 | 29 | 13 | 15 | 208 | 240 |
| | 17000 | 29 | 13 | 15 | 208 | 240 |
| | 19200 | 29 | 13 | 15 | 416 | 480 |
| | 19400 | 29 | 13 | 15 | 416 | 480 |
| | 21600 | 29 | 13 | 15 | 832 | 960 |
| | 21800 | 29 | 13 | 15 | 832 | 960 |
| 2743 | 4800 | 3 | 2 | 2 | 8 | 8 |
| | 5000 | 3 | 2 | 2 | 8 | 8 |
| | 7200 | 10 | 3 | 3 | 12 | 12 |
| | 7400 | 10 | 3 | 3 | 12 | 12 |
| | 9600 | 17 | 5 | 5 | 20 | 20 |
| | 9800 | 17 | 5 | 5 | 20 | 20 |
| | 12000 | 24 | 8 | 10 | 32 | 40 |
| | 12200 | 24 | 8 | 10 | 32 | 40 |
| | 14400 | 31 | 15 | 18 | 60 | 72 |
| | 14600 | 31 | 15 | 18 | 60 | 72 |
| | 16800 | 30 | 14 | 17 | 112 | 136 |
| | 17000 | 30 | 14 | 17 | 112 | 136 |
| | 19200 | 29 | 13 | 15 | 208 | 240 |
| | 19400 | 29 | 13 | 15 | 208 | 240 |
| | 21600 | 28 | 12 | 14 | 384 | 448 |
| | 21800 | 28 | 12 | 14 | 384 | 448 |
| | 24000 | 27 | 11 | 13 | 704 | 832 |
| | 24200 | 27 | 11 | 13 | 704 | 832 |
| | 26400 | 26 | 10 | 12 | 1280 | 1536 |
| | 26600 | 26 | 10 | 12 | 1280 | 1536 |
| 2800 | 4800 | 2 | 2 | 2 | 8 | 8 |
| | 5000 | 3 | 2 | 2 | 8 | 8 |
| | 7200 | 9 | 3 | 3 | 12 | 12 |
| | 7400 | 10 | 3 | 3 | 12 | 12 |
| | 9600 | 16 | 4 | 5 | 16 | 20 |
| | 9800 | 17 | 5 | 5 | 20 | 20 |
| | 12000 | 23 | 8 | 9 | 32 | 36 |
| | 12200 | 24 | 8 | 10 | 32 | 40 |
| | 14400 | 30 | 14 | 17 | 56 | 68 |
| | 14600 | 30 | 14 | 17 | 56 | 68 |
| | 16800 | 29 | 13 | 15 | 104 | 120 |
| | 17000 | 29 | 13 | 15 | 104 | 120 |
| | 19200 | 28 | 12 | 14 | 192 | 224 |
| | 19400 | 28 | 12 | 14 | 192 | 224 |
| | 21600 | 26 | 10 | 12 | 320 | 384 |
| | 21800 | 27 | 11 | 13 | 352 | 416 |
| | 24000 | 25 | 9 | 11 | 576 | 704 |
| | 24200 | 26 | 10 | 12 | 640 | 768 |
| | 26400 | 24 | 8 | 10 | 1024 | 1280 |
| | 26600 | 25 | 9 | 11 | 1152 | 1408 |
| 3000 | 4800 | 2 | 2 | 2 | 8 | 8 |
| | 5000 | 2 | 2 | 2 | 8 | 8 |
| | 7200 | 8 | 2 | 3 | 8 | 12 |
| | 7400 | 8 | 2 | 3 | 8 | 12 |
| | 9600 | 14 | 4 | 4 | 16 | 16 |
| | 9800 | 15 | 4 | 5 | 16 | 20 |
| | 12000 | 21 | 7 | 8 | 28 | 32 |
| | 12200 | 21 | 7 | 8 | 28 | 32 |
| | 14400 | 27 | 11 | 13 | 44 | 52 |
| | 14600 | 28 | 12 | 14 | 48 | 56 |
| | 16800 | 26 | 10 | 12 | 80 | 96 |
| | 17000 | 26 | 10 | 12 | 80 | 96 |
| | 19200 | 24 | 8 | 10 | 128 | 160 |
| | 19400 | 24 | 8 | 10 | 128 | 160 |
| | 21600 | 30 | 14 | 17 | 224 | 272 |
| | 21800 | 31 | 15 | 18 | 240 | 288 |
| | 24000 | 29 | 13 | 15 | 416 | 480 |
| | 24200 | 29 | 13 | 15 | 416 | 480 |
| | 26400 | 27 | 11 | 13 | 704 | 832 |
| | 26600 | 28 | 12 | 14 | 768 | 896 |
| | 28800 | 26 | 10 | 12 | 1280 | 1536 |
| | 29000 | 26 | 10 | 12 | 1280 | 1536 |
| 3200 | 4800 | 1 | 2 | 2 | 8 | 8 |

TABLE 11-continued

| Symbol Rate, R | Data Rate, R | K | M minimum | M expanded | L minimum | L expanded |
|---|---|---|---|---|---|---|
| | 5000 | 1 | 2 | 2 | 8 | 8 |
| | 7200 | 7 | 2 | 2 | 8 | 8 |
| | 7400 | 7 | 2 | 2 | 8 | 8 |
| | 9600 | 13 | 4 | 4 | 16 | 16 |
| | 9800 | 13 | 4 | 4 | 16 | 16 |
| | 12000 | 19 | 6 | 6 | 24 | 24 |
| | 12200 | 19 | 6 | 6 | 24 | 24 |
| | 14400 | 25 | 9 | 11 | 36 | 44 |
| | 14600 | 25 | 9 | 11 | 36 | 44 |
| | 16800 | 31 | 15 | 18 | 60 | 72 |
| | 17000 | 31 | 15 | 18 | 60 | 72 |
| | 19200 | 29 | 13 | 15 | 104 | 120 |
| | 19400 | 29 | 13 | 15 | 104 | 120 |
| | 21600 | 27 | 11 | 13 | 176 | 208 |
| | 21800 | 27 | 11 | 13 | 176 | 208 |
| | 24000 | 25 | 9 | 11 | 288 | 352 |
| | 24200 | 25 | 9 | 11 | 288 | 352 |
| | 26400 | 31 | 15 | 18 | 480 | 576 |
| | 26600 | 31 | 15 | 18 | 480 | 576 |
| | 28800 | 29 | 13 | 15 | 832 | 960 |
| | 29000 | 29 | 13 | 15 | 832 | 960 |
| | 31200 | 27 | 11 | 13 | 1408 | 1664 |
| | 31400 | 27 | 11 | 13 | 1408 | 1664 |
| 3429 | 4800 | 0 | 1 | 1 | 4 | 4 |
| | 5000 | 0 | 1 | 1 | 4 | 4 |
| | 7200 | 6 | 2 | 2 | 8 | 8 |
| | 7400 | 6 | 2 | 2 | 8 | 8 |
| | 9600 | 11 | 3 | 3 | 12 | 12 |
| | 9800 | 12 | 3 | 4 | 12 | 16 |
| | 12000 | 17 | 5 | 5 | 20 | 20 |
| | 12200 | 17 | 5 | 5 | 20 | 20 |
| | 14400 | 22 | 7 | 8 | 28 | 32 |
| | 14600 | 23 | 8 | 9 | 32 | 36 |
| | 16800 | 28 | 12 | 14 | 48 | 56 |
| | 17000 | 28 | 12 | 14 | 48 | 56 |
| | 19200 | 26 | 10 | 12 | 80 | 96 |
| | 19400 | 26 | 10 | 12 | 80 | 96 |
| | 21600 | 31 | 15 | 18 | 120 | 144 |
| | 21800 | 24 | 8 | 10 | 128 | 160 |
| | 24000 | 29 | 13 | 15 | 208 | 240 |
| | 24200 | 29 | 13 | 15 | 208 | 240 |
| | 26400 | 26 | 10 | 12 | 320 | 384 |
| | 26600 | 27 | 11 | 13 | 352 | 416 |
| | 28800 | 24 | 8 | 10 | 512 | 640 |
| | 29000 | 24 | 8 | 10 | 512 | 640 |
| | 31200 | 30 | 14 | 17 | 896 | 1088 |
| | 31400 | 30 | 14 | 17 | 896 | 1088 |
| | 33600 | 27 | 11 | 13 | 1408 | 1664 |
| | 33800 | 28 | 12 | 14 | 1536 | 1792 |

8. Summary

A novel methodology for a Control Channel has been described. The channel allows faster seamless rate change and precoder tap exchange than the baseline procedure for seamless rate change, allowing for more robust transmission of control information. It can also be used to convey side-information in the case of multiple data applications, serving the purpose of mode switching. Thus, with a single control channel both the needs for seamless rate change and transmitting control information for multiple data applications can be met. Further extensions are possible to allow for a variety of modem control applications and multiplexing.

The present invention has been described above with reference to preferred embodiments. However, those skilled in the art will recognize that changes and modifications may be made to the described embodiments without departing from the scope of the present invention. These and other changes or modifications are intended to be included within the scope of the present invention, as expressed in the following claims.

We claim:

1. A method of transmitting control information between a first modem and a second modem operating in accordance with a predetermined ITU V-series modem recommendation without substantially affecting the predetermined modem recommendation in operation, comprising the steps of:

providing said first modem and said second modem in communication in accordance with the predetermined modem recommendation at a first data rate R1;

transmitting a data frame from said first modem to said second modem, said data frame comprising a plurality of mapping frames, wherein one of said mapping frames contains a mode indicator (MI) encoded in accordance with an encoding scheme;

decoding said MI by said second modem in accordance with said encoding scheme;

proceeding with communication in accordance with said predetermined modem recommendation at a second data rate R2 when said MI indicates control data; and receiving control information at said second data rate R2 at said second modem.

2. A method according to claim 1, wherein:

said proceeding step is initiated at the beginning of a subsequent data frame transmitted after said data frame; and said first modem and said second modems communicate at said second data rate R2 for the duration of at least one data frame transmitted after said data frame.

3. A method according to claim 2, wherein said at least one data frame transmitted after said data frame comprises control data and user data.

4. A method according to claim 1, wherein:

said one of said mapping frames comprises a plurality of symbols; and said MI comprises one bit from each of said plurality of symbols.

5. A method according to claim 1, further comprising the steps of:

continuing with communication in accordance with said predetermined modem recommendation at said first data rate R1 when said MI indicates user data; and receiving user information at said first data rate R1 at said second modem.

6. A method according to claim 1, wherein said control information comprises a rate change request for changing said first data rate R1 to a different data rate employed for the subsequent transmission of user information.

7. A method according to claim 1, wherein said second data rate R2 is lower than said first data rate R1.

8. A method according to claim 1, wherein said MI is encoded to achieve higher reliability during transmission than that of the main channel transmission.

9. A method according to claim 1, wherein said control information comprises characteristics of multiple data information for operation in conjunction with a data mode in accordance with said predetermined modem recommendation.

10. A method according to claim 1, wherein said predetermined modem recommendation is the V.34 Recommendation.

11. A method of processing a control indicator in a trellis-coded modulation system with a signal point constellation of "A" points comprising a plurality, "b", of subconstellations, the method comprising the steps of:

constructing a block code of length "c" such that said block code is capable of producing a plurality, "$b^c$", of codewords;

selecting "d" codewords from said plurality of codewords such that the minimum distance between said "d" codewords is maximized;

arranging values of said control indicator using said "d" codewords; and transmitting said control indicator in a plurality, "c", of transmit symbols, where each of said plurality of transmit symbols has the same dimensionality as the signal points contained in said signal point constellation.

12. A method according to claim 11, wherein:

said block code is a linear block code over GF(b), where GF denotes Galois field; and b is a prime number or a power of a prime number.

13. A method according to claim 11, wherein b=2, c=4, and d=2.

14. A method according to claim 11, wherein said block code is a non-linear block code.

15. A method according to claim 11, wherein said trellis-coded modulation system is compliant with the ITU V.34 Recommendation for modems.

16. A method according to claim 11, further comprising the steps of:

receiving a plurality of received symbols corresponding to said plurality of transmit symbols; and decoding said control indicator substantially without trellis decoder delay.

17. A method according to claim 16, wherein said decoding step is performed in a manner that does not affect trellis decoding of user data.

* * * * *